Patented Oct. 9, 1945

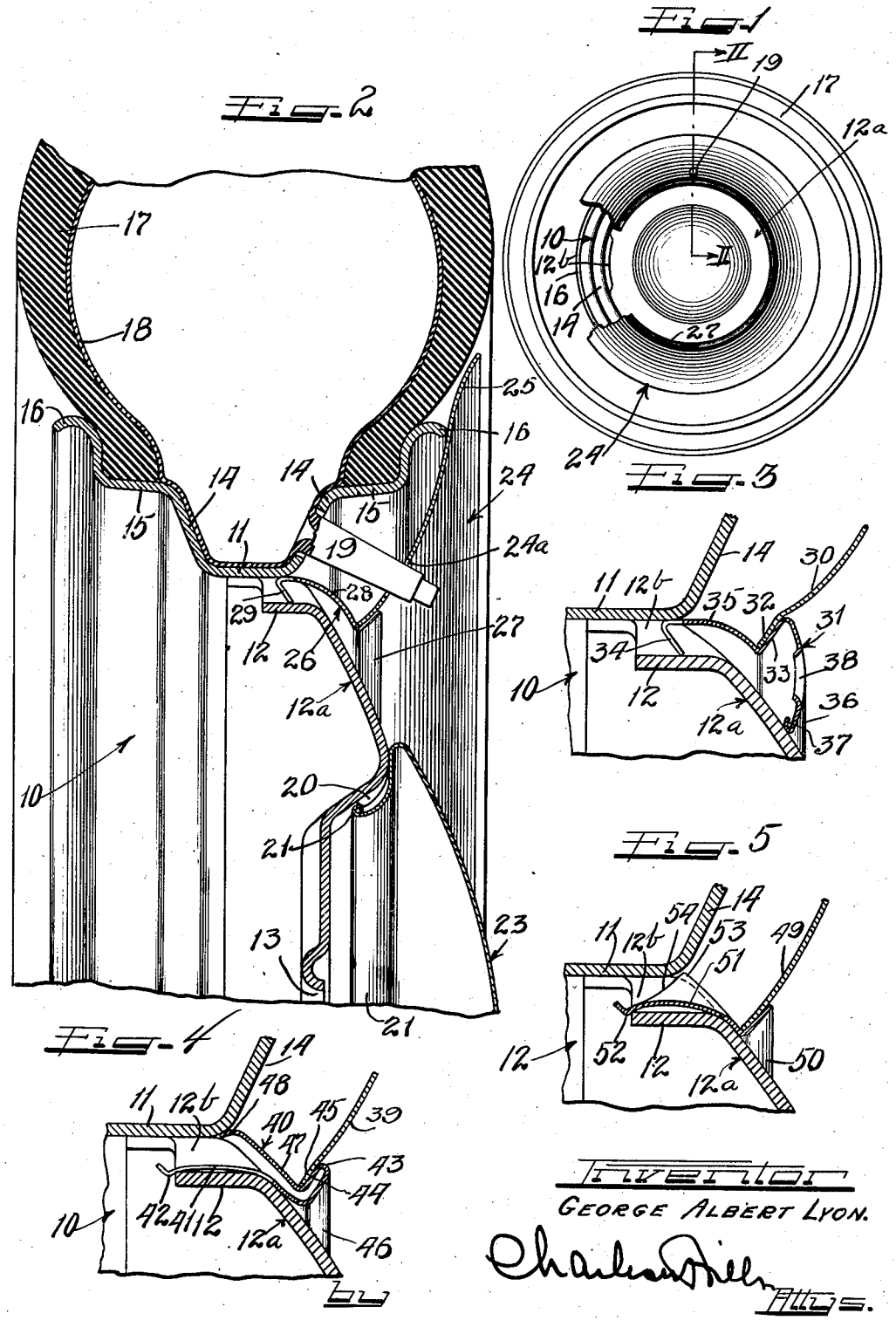

2,386,237

UNITED STATES PATENT OFFICE 2,386,237

WHEEL STRUCTURE

George Albert Lyon, Allenhurst, N. J.

Application July 22, 1943, Serial No. 495,678

11 Claims. (Cl. 301—37)

This invention is directed to an improved wheel structure and relates more particularly to an improved cover assembly therefor.

An important object of the invention is to provide for a wheel structure and a cover assembly therefor, improved retaining means for maintaining the cover over the outer side of the wheel structure to conceal the same.

Still another object of the invention is to provide an improved wheel structure of the type having a drop center tire rim part and a central load bearing portion associated with the radially inner surface of the base flange thereof, there being circumferentially spaced openings along the junction of the tire rim and the central load bearing portion, these openings being utilized to receive the attachment parts of improved retaining means for holding the cover over the outer side of the wheel structure.

Still another object of the invention is to provide an improved wheel structure and cover assembly therefor and particularly an improved retaining arrangement for securing the cover to the wheel structure, the retaining means being provided with portions arranged to retainingly engage the wheel structure by axial inward movement of the retaining means and the cover member against the wheel structure and with other portions for engaging the wheel structure after a predetermined degree of such axial movement whereby proper spacing and positioning of the cover member is obtained.

It is further object of the invention to provide improved retaining means for securing a circular cover over the outer side of a wheel structure, said retaining means being arranged to provide for the circulation of air from the axially outer side to the axially inner side of the wheel structure and through the openings between the central load bearing portion and the tire rim, thereby to utilize the cooling effect of this circulated air on the wheel and the associated vehicle parts such as the brake drum or the like.

In accordance with the general features of my invention, there is provided herein a wheel structure having a tire rim of the drop center type and a central load bearing portion associated therewith, there being circumferentially spaced apertures between the tire rim and the central load bearing portion along the connection therebetween, there also being a cover assembly including an annular cover part formed from a synthetic plastic material and having physical characteristics enabling it to be temporarily flexed without permanent distortion thereof and to be form retaining and self-sustaining, this cover being secured to the wheel structure by means of an annular member having axially inwardly extending fingers arranged for retaining engagement through the openings between the tire rim and the central load bearing portion and having an axially outer portion arranged to retainingly receive the retaining part of the wheel cover, said retaining annulus being spaced from the surface of the wheel structure to afford circulation of air therebehind, this circulated air passing through the wheel openings to facilitate ventilation of the wheel and appurtenant parts of the vehicle such as the brake drum or the like.

In accordance with other general features of my invention, there is provided herein improved retaining means for securing a wheel cover over the outer side of a wheel structure, said retaining means including a portion for retainingly receiving the marginal part of the cover to form substantially a unitary structure between the retaining means and the cover, the retaining means having other portions constructed and arranged to contact and abut a portion of the outer surface of the wheel structure when the cover and retaining means assembly is urged axially inwardly thereagainst to dispose a wheel retaining part in its ultimate position.

In accordance with one of the forms of my invention there is provided herein a retaining annulus having inwardly extending wheel engaging fingers and having an axially outwardly disposed ornamental part terminating in an edge which is arranged to abut the adjacent portion at the outer surface of the wheel structure when the retaining fingers have been urged inwardly of wheel openings in the wheel a predetermined amount. In accordance with another form of the invention, there is provided a retaining element for engaging a cover member, said element having axially inwardly extending retaining fingers arranged to extend into and through wheel openings in the wheel structure, these finger elements being provided with radially extending flange elements of greater depth than the depth of said openings whereby the axially inward movement of the fingers is prevented by abutment of said flanges with the wheel structure after axial inward movement to a predetermined amount has been obtained. In accordance with another embodiment of the invention, there is provided herein a retaining annulus having axially inwardly extending finger elements extending through the openings in the wheel structure, this annulus having a portion bent back upon the fingers and extending in a plane outside of the radially outer side of the respective wheel opening, whereby the bent back portion abuts the junction between the tire rim and the central load bearing portion first by virtue of the disposal thereof outside of the plane to the greater outer extremity of the openings and second by the continuity thereof laterally outside of the confines of the wheel opening.

Other objects and advantages of the invention will become apparent from the following description and accompanying drawing in which:

Figure 1 is a side elevational view, with a portion of the cover being broken away, of a wheel structure embodying one form of my invention;

Figure 2 is a fragmentary radial cross-sectional view taken along the lines II—II of Figure 1;

Figure 3 is a fragmentary cross-sectional view of a modified form of my invention;

Figure 4 is a fragmentary radial cross-sectional view of a modified form of my invention; and Figure 5 is a fragmentary radial cross-sectional view of still a further modified form of my invention.

It will be understood that the embodiments shown herein are for illustrative purposes only and may be changed or modified without departing from the spirit and scope of the invention as set forth in the appended claims.

In the embodiment shown in Figures 1 and 2, there is provided a tire rim 10 having a base flange 11 to which there is secured, as by riveting or welding, or the like, an axially inwardly extending flange 12 of a central load bearing portion 12a which is further provided with a central bolt-on flange 13. The flange 12, as will be seen from Figures 1 and 2, is provided with radially inwardly depressed parts at circumferentially spaced portions thereof, thereby to provide circumferentially spaced apertures 12b at the junction of the tire rim 10 and the central load bearing portion 12a. The tire rim is further provided with opposite side wall flanges 14, opposite intermediate flanges 15 and opposite edge portions 16 between which a tire 17, having an inner tube 18, is adapted to be disposed. The inner tube 18 is further provided with a valve stem 19 which extends through a suitable aperture provided in the axially outer side wall 14 of the tire rim.

In the construction of Figure 2, the central load bearing portion 12a is provided at a radially intermediate part thereof, in the vicinity of the radially outer extremity of the bolt-on flange 13, with spaced protuberances 20 which, as shown, extend radially inwardly to receive a snap-on bead 21 which terminates a resilient snap-on flange 22 of a central hub cap member 23. It will be seen that since the diameter of the circle prescribed by the snap-on bead 21 is normally larger than that prescribed by the radially inner extremity of the circumferentially spaced humps 20, axial inward movement of the bead 21 over the humps 20 causes resilient distortion of the bead so that when the bead is in its axial inward position against the axially inner curvatures of the protuberances 20, it may again expand toward its normal position, thus to securely retain the central hub cap member 23 upon the wheel structure.

The cover assembly shown herein is completed by the provision of an annulus 24 which may be made from a synthetic plastic sheet material possessed with physical characteristics enabling it to be flexed resiliently, temporarily out of its normal position without distortion and enabling it to be self-sustaining and form retaining as well as flexible in the aforementioned manner. The trim member 24 here shown is annular in form and is provided with a cross-sectional configuration of such expanse that the radially outer part thereof extends beyond the edge portion 16 of the tire rim to conceal the junction between the tire 17 and the tire rim and whereby the radially inner margin thereof extends radially inwardly of the junction between the load bearing portion 12a and the tire rim 10, thus to conceal that junction. Furthermore, the trim member 24 is formed with a cross-sectional configuration so that it substantially simulates the curvature of the side wall of the tire 17, thereby to give the appearance of being a part thereof and a continuation thereof to impart to the wheel structure the appearance of a massive tire upon a wheel structure of minimum dimension and to give the effect of a white side wall if colored white. It will be seen that when a relatively long valve stem 19 is used, the cover member 24 is provided preferably with an aperture 24a for receiving this valve stem.

To the end that the cover member 24 may be efficiently retained upon the wheel structure, in the position shown in Figure 2, that is with the radially outer portion thereof extending radially outwardly beyond the edge portion 16 of the tire rim and with this portion, as shown at 25 flared slightly axially outwardly and in such a position that it hugs the side wall of the tire, there is provided herein a retaining annulus 26. This retaining annulus serves the dual purpose of securing the cover to the wheel structure and of providing an ornamental border 27 for the cover. As shown, the annulus 26 includes an axially outer flange 27 which extends axially outwardly and radially outwardly, an inner intermediate body portion 28 and rear fingers having obliquely disposed radially inwardly, axially outwardly extending terminal portions 29, these portions 29 being disposed in circumferential alignment with the respective wheel openings 12b in the wheel structure.

Preferably the terminal end of the finger 29 is constructed to bite into the radially outer surface of the respective depressed portion 12 of the load bearing portion of the wheel structure 12a, this biting engagement being augmented by the resiliency of the fingers 29 and by the fact that they normally assume an unsprung position slightly more radially inwardly than is shown in Figure 2. Thus they are deflected when urged axially inwardly of the wheel opening to bitingly engage the wheel as described above.

When the fingers 29 are in their retaining position on the wheel structure as shown in Figure 2, it will be seen that the intermediate portion 28 of each of the retaining members is arranged to extend over the adjacent portion of the outer side of the central load bearing portion 12a of the wheel and in spaced relationship thereto, the flange 27 thereof extending radially outwardly thereby to secure the cover 24 on the wheel structure and yet afford an annular open space at the radially inner extremity of the cover member 24, which space communicates, through the openings 12b with the axially inner side of the wheel. With this construction, it will be seen that free circulation of air is provided whereby efficient ventilating of the adjacent portions of the wheel structure and the adjacent portions of the vehicle, such as the brake drum or the like, may be obtained.

It will be seen that continued axial inward movement of the retaining member 26 beyond the position shown in Figure 2 will substantially close the spacing between the same and the outer surface of the central load bearing portion 12. To the end that further axial inward movement of the retaining member may be delimited, the axially annular edge of the retaining member 26 is formed on a plane disposed axially outwardly of the fingers 29. Thus, when the fingers are forced into the opening 12b in the manner shown in Figure 2, further movement is prevented by abutment of the intermediate edge portions of the retaining member 26 and the corner junction formed between the tire rim 10 and those portions of the central load bearing portion 12a between the respective apertures 12b.

In the construction shown in Figure 3 the cover member 30, which is preferably of similar construction to that shown at 24 in Figure 2, is retained upon the wheel structure by virtue of a retaining annulus 31. In the position shown in Figure 3, the cover 30 is sprung axially outwardly from the outer periphery thereof, this manipulation being due to the self-supporting, form-sustaining, temporarily flexible characteristics thereof, and it will be seen that in this position the inner peripheral margin 32 thereof is retained in flush engagement with an intermediate annular flange 33 of the retaining member 31. In this construction the retaining member 31 is provided with axially inner fingers 34 similar to those shown at 29 in Figure 2 and having the same functions as those formerly described, while the intermediate annular portion 35 of the retaining member 31 is likewise spaced from the adjacent portion of the outer surface of the wheel structure. Additionally, the retaining member 31 is provided with an outer, exposed ornamental, supporting portion 36 wihch is integral with the radially outer edge of the cover supporting flange 33 and has the free edge 37 thereof arranged for abutment with the adjacent portion of the outer surface of the load bearing part 12a of the wheel structure. Preferably the retaining member 31 is provided with a plurality of circumferentially spaced apertures 38 through which air may pass, this air then passing between the spaced intermediate flange 35 and the adjacent portion of the wheel structure and thus to the respective wheel openings 12b to ventilate the assembly as heretofore described.

An additional advantage of the construction shown in Figure 3 is obtained by virtue of the abutment at the edge 37 of the retaining member 31 with the adjacent portion of the outer surface of the wheel structure. When the assembled cover 30 and retaining member 31 are forced axially inwardly so that the fingers 34 extend into the wheel openings 12b this movement may continue until such a time as the edge 37 abuts the adjacent portion of the wheel structure, whereupon further axial movement is prevented and the cover 30 is then properly positioned upon the wheel structure.

Thus it will be seen that in the construction of Figure 3 there is provided an assembly in which the cover is automatically positioned on the wheel structure without any attention on the part of the user during the assembly operation and furthermore, there is provided a construction in which free circulation of air through the apertures 12b is permitted.

In the construction of Figure 4, the cover member 39 is retained upon the wheel structure by a further modified form of retaining member. In this construction the retaining member 40 is provided with axially inwardly extending fingers 41 having terminals provided with radially inwardly protruding portions 42, these fingers being spaced circumferentially to coincide with the respective openings 12b in the wheel and the respective protuberances 42 being arranged to overlap the radially inner edge of the depressed portions 12 of the flange on the central load bearing portion 12a to retain the same on the wheel structure.

The retaining member 40 also includes an annular part folded back upon the remainder thereof as at 43, the portions thereof from the fold back 43 extending radially outwardly, axially outwardly for oblique disposition so that the annular flange 44 is disposed in a position to receive the radially inner marginal part 45 of the cover 39, while the flange 46 is exposed from the outer side of the wheel structure and may be constructed from stainless steel as in the case of retaining members 26 and 31 of Figures 2 and 3 respectively. Thus when the flange 46 is highly buffed, it presents a lustrous border for the radially inner edge of the cover 39.

The flange 44 terminates in a further flange 47 which extends radially outwardly axially inwardly and may, if desired, terminate in a curled terminal edge 48, this edge, whatever its shape, being arranged to present an annular abutment of the corner junction formed between the tire rim 10 and the central load bearing portion 12a. Here again, when the cover assembly including the cover 39 and the retaining member 40 is urged axially inwardly so that the fingers 41 extend into the respective wheel openings, an abutment, by means of the edge 48 is obtained so that this inward movement is limited to a predetermined amount, whereby automatic positioning of the cover is obtained. The portions 41 and 48 are normally sprung outwardly and forced together in the assembly operation.

In the construction of Figure 5 the cover member 49 is retained upon the wheel structure by means of a retaining annulus 50 which includes axially inwardly extending fingers 51 having terminal ends provided with radially inwardly extending humped portions 52, arranged to extend axially inwardly of the inner edge of the depressed portions of the flange 12 to retain the same upon the wheel structure. In this construction the members 21 are provided with radially extending flange-like members 53 which are provided with a radial expanse greater than the radial depth of the respective opening whereby inward movement of the assembly including the cover 49 and the retaining member 50 is delimited by abutment of the leading edge 54 of the members 53 with the adjacent portion of the outer surface of the tire rim.

From the foregoing it will be seen that there is provided herein for a wheel structure a cover assembly including a part arranged for disposition over the outer side thereof to conceal the junction between the tire rim and the central load bearing portion there being provided retaining means which serve to further ornament the wheel structure, to provide for the circulation of air through the openings in the wheel structure and to provide for delimiting the axial inward movement of the retaining means during the assembly thereof with the wheel structure whereby the spacing thereof from the wheel structure is maintained to provide for such ventilation and whereby the cover member is automatically and easily disposed in a predetermined proper position upon the wheel structure.

What I claim is:

1. In a wheel structure having a tire rim and a load bearing portion, there being circumferentially spaced openings along the junction between said rim and load bearing portion, a cover for disposition over the outer side of the wheel structure and retaining means for securing the cover in position, said retaining means including portions for retainingly engaging the wheel structure, a portion for retainingly engaging the cover and an intermediate portion disposed in spaced relation to the adjacent part of the surface of the wheel to define therewith an air passage to the wheel openings, said cover and cover engaging portion of the retaining means being arranged to afford an opening for said air passage.

2. In a wheel structure having a tire rim and a load bearing portion, there being circumferentially spaced openings along the junction between said rim and load bearing portion, a cover for disposition over the outer side of the wheel structure, said cover being formed from a synthetic plastic material and having physical characteristics enabling it to be form retaining and yet resiliently locally flexible, and metallic retaining means for securing the cover in position, said retaining means including portions for retainingly engaging the wheel structure, a portion for retainingly engaging the cover and an intermediate portion disposed in spaced relation to the adjacent part of the surface of the wheel to define therewith an air passage to the wheel openings, said cover and cover engaging portion of the retaining means being arranged to afford an opening for said air passage.

3. In a wheel structure having a tire rim and a load bearing portion, there being circumferentially spaced openings at the junction of said rim and said load bearing portion, a cover assembly for disposition over the outer side of the wheel and retaining means for securing the cover on the wheel, said retaining means including an annulus having substantially axially inwardly extending parts for engaging the wheel, a portion for retainingly engaging the cover and an intermediate portion disposed in spaced relation to the adjacent portion of the outer surface of the wheel to provide an air passage to the openings in the wheel, and an abutment portion for engaging the wheel to maintain said intermediate portion in spaced relation to the surface of the wheel when said wheel engaging parts are in retaining position with respect to the wheel.

4. In a wheel structure having a tire rim and a load bearing portion, there being circumferentially spaced openings through said wheel structure, a cover for disposition over the outer side of the wheel structure to substantially conceal the outer surface thereof and retaining means for securing said cover over the wheel, said retaining means including a cover receiving portion and portions arranged for retainingly engaging the wheel, said portions being provided with an intermediate bridging portion disposed in spaced relationship to the wheel to afford an air passage to said openings in the wheel thereby to afford ventilation of the wheel parts and adjacent portions of the vehicle.

5. In a wheel structure having a tire rim and a load bearing portion, there being circumferentially spaced openings through said wheel structure, a cover for disposition over the outer side of the wheel structure to conceal the outer surface thereof and retaining means for securing said cover over the wheel, said retaining means including a cover receiving portion and portions arranged for retainingly engaging the wheel, said portions being provided with an intermediate bridging portion disposed in spaced relationship to the wheel to afford an air passage to said openings in the wheel thereby to afford ventilation of the wheel parts and adjacent portions of the vehicle, and means on said retaining member for delimiting movement thereof with respect to the wheel thereby to maintain said intermediate bridging portion thereof in spaced relationship to the wheel.

6. In a wheel structure including a tire rim and a central load bearing portion, there being circumferentially spaced apertures at the junction of said rim and load bearing portion, a cover assembly including a cover part arranged for disposition over the outer side of the wheel to conceal the junction between the rim and the load bearing portion and retaining means for securing the cover on the wheel including an annular part having wheel engaging elements extending substantially axially from one end thereof, said elements being arranged for retaining engagement with the wheel structure and having at the other edge thereof a portion for retainingly engaging the cover, said intermediate portion being disposed in spaced relationship from the opposed surface of the wheel structure to afford an air passage to the openings in the wheel and said cover retaining portion being formed to extend radially outwardly away from the surface of the wheel structure to provide an opening for said passage.

7. In a wheel structure including a tire rim and a central load bearing portion, there being circumferentially spaced openings along the junction between the tire rim and the load bearing portion, an annular cover for disposition over the outer side of the tire rim to conceal the outer surface thereof and retaining means for maintaining the cover upon the wheel structure, said retaining means including an annular part having at the axially inner edge thereof wheel engaging elements, said annular part being disposed in spaced relationship to the adjacent surface of the wheel structure when said elements are disposed in wheel retaining position and having at the opposite edge thereof a cover receiving flange, said flange terminating in a radially extending bead, said bead being provided with an edge for abutting the adjacent portion of the outer surface of the wheel structure when said retaining elements are urged into wheel engaging position with the intermediate annular part in spaced relationship from the wheel structure, said bead being provided with a plurality of apertures arranged to serve as openings for the passage formed between the intermediate annular part and the adjacent portion of the wheel structure.

8. In a wheel structure including a tire rim and a central load bearing portion, there being circumferentially spaced apertures along the junction between the rim and the load bearing portion, a cover member for disposition over the outer side of the wheel structure and arranged to conceal the outer side of the tire rim, said cover member having a radially inner part arranged to extend radially inwardly beyond the junction of said rim and said load bearing portion and retaining means for maintaining the cover in disposition over the outer side of the wheel structure, said retaining means including an annular portion bent back upon itself and bent intermediately to provide an axially outer ornamental, cover receiving flange, one of said bent back portions terminating in inwardly extending fingers arranged for resilient engagement in the wheel openings to retain the assembly upon the wheel structure and the other of said bent back portions terminating in a continuous edge arranged to engage in the corner formed at the junction of the tire rim and the central load bearing portion when said resilient retaining elements are moved axially inwardly into engagement with the wheel openings, said finger elements and said last named turned back edge portion being arranged to spring away from one another and being drawn toward one another thereof in this position, thereby to securely retain the elements in the openings of the wheel structure.

9. In a wheel structure including a tire rim and a central load bearing portion, there being circumferentially spaced apertures at the junction of said rim and load bearing portion, a cover member for disposition over the outer side of the wheel structure for concealing the outer surface of the tire rim, and retaining means for maintaining the cover over the wheel including a cover retaining portion and axially inwardly extending wheel engaging portions, said last named portions being aligned with the respective openings in the wheel structure and being arranged to be extended into retaining engagement with the inner part thereof, an intermediate annular bridging portion between said cover retaining portion and said wheel engaging portion and abutment means formed on said intermediate portion extending radially therefrom, said abutment means having a radial expanse greater than that of the respective wheel opening thereby to afford an abutment to delimit axial inward movement of the wheel engaging means into the wheel opening to retain said cover in a predetermined position with respect to the wheel structure.

10. In a cover assembly for disposition over the outer side of a wheel structure having a tire rim and a central load bearing portion, there being circumferentially spaced openings along the junction of the rim and the load bearing portion, a radially outer, resilient, annular cover member and having a cross sectional expanse so that it extends substantially from the radially outer extremity of the rim, radially inwardly beyond the junction of the rim and the central load bearing portion of the wheel to conceal said junction, and an annular, relatively rigid, metallic retaining member for maintaining the cover member on the wheel, said annular, relatively rigid retaining member including means for engaging in said openings in the wheel to retain the same on the wheel and an axially outer, radially outwardly extending flange portion for receiving on the axially inner surface thereof, the radially inner margin of the resilient, annular cover member, whereby it overlies the outer side of said margin of the cover member to retain the same on the wheel and protect the same against damage.

11. The cover structure of claim 10 further characterized by the annular retaining member being of angular cross-section with said means thereof comprising one leg curved over the wheel loading bearing portion and with said flanged portion thereof comprising the other leg.

GEORGE ALBERT LYON.